US005903958A

United States Patent [19]

Whaley

[11] Patent Number: 5,903,958

[45] **Date of Patent: *May 18, 1999**

[54] SPUR EYELET

[75] Inventor: Paul Whaley, Herculaneum, Mo.

[73] Assignee: U.S. Ring Binder, New Bedford, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 09/009,901

[22] Filed: Jan. 20, 1998

[51] Int. Cl.[6] .............................. A42F 13/00; F16B 19/00

[52] U.S. Cl. .......................... 24/703.5; 24/703.6; 402/75; 402/27

[58] Field of Search ............................... 24/703.5, 703.6, 24/703.4, 703.3, 703.2, 703.1; 402/75, 27, 14

[56] References Cited

U.S. PATENT DOCUMENTS

| | | | |
|---|---|---|---|
| 534,023 | 2/1895 | Vurgason | 24/703.4 |
| 908,597 | 1/1909 | Morden | 402/75 |
| 1,943,465 | 1/1934 | Watson | 402/75 |
| 2,888,934 | 6/1959 | Segal | 402/75 |
| 3,252,461 | 5/1966 | Schade | 24/703.6 |
| 5,160,209 | 11/1992 | Scheuessler | 402/75 |
| 5,718,530 | 2/1998 | Tibbetts | 402/75 |

*Primary Examiner*—Victor N. Sakran
*Attorney, Agent, or Firm*—Polster, Lieder, Woodruff & Lucchesi, L.C.

[57] ABSTRACT

A ring binder (10) includes a ring metal (18) securable to a spine portion (16) of the binder. A spur eyelet (30) used for this purpose includes a post (32) one end (34) of which attaches to the ring metal. A plate (40) is formed at the other end of the post. Radiating outwardly from the underside of the plate are a plurality of concentrically formed spurs (50). Each spur has barbs (56) formed on an outer end (54) of the spur. To attach the ring metal to the spine, the spurs are pushed into the body of the spine. Thereafter, the barbs keep the eyelet from being pulled away from the body of the spine thereby preventing the ring metal from separating from the binder.

14 Claims, 2 Drawing Sheets

SPUR EYELET

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates to ring binders, and more particularly, to a spur eyelet for use in securing a ring metal to a spine portion of the binder.

A ring metal, as it name implies, is typically an assembly, formed of metal, and including binder rings. The binder rings comprises two sections which are movable relative to each other to open and close the binder so things can be stored in, and removed from, the binder. The binder rings and the lever mechanism by which they are opened and closed all form part of the ring metal assembly. A plate covers the lever mechanism and usually has provisions at each end for attachment of the ring metal to a spine section of the binder. One way of attachment has been to use rivets. However, it has been found that other ways of attachment are more secure and better able to withstand the rigors to which the binder may be put. In U.S. Pat. No. Des. 377,805 an alternate attachment structure is shown which uses a radial pattern of tabs formed on each end of the plate. The tabs are pushed into the body portion of the spine to secure the ring metal in place. While useful for its intended purpose, other constructions are more reliable both to secure the ring metal to the binder in the first instance, and to see that it does not come off thereafter.

BRIEF SUMMARY OF THE INVENTION

Among the several objects of the present invention may be noted the provision of a ring metal used in a binder, the ring metal including an improved structure for attaching the ring metal to a spine of the binder;

the provision of such an improved structure to include a spur eyelet having a post with one end securable to the ring metal and with a plurality of spurs extending radially outwardly from the other end of the post, each spur having a barb formed thereon;

the provision of the spur eyelet structure to be readily insertable in the binder spine with barbed portions of the spurs preventing the metal from subsequently being pulled away from the spine; and, the provision of such a spur eyelet structure which is low cost, easy to manufacture, and readily installed.

In accordance with the invention, generally stated, a ring binder includes a ring metal securable to a spine portion of the binder. A spur eyelet used for this purpose includes a post one end of which attaches to the metal. A plate is formed on the other end of the post. Radiating outwardly from the underside of the plate are a plurality of concentrically formed spurs. Each spur has a barbed end. To attach the ring metal to the spine, the spurs are pushed into the body of the spine. Thereafter, the barbs keep the eyelet from being pulled away from the body of the spine thereby preventing the ring metal from separating from the binder. Other objects and features will be in part apparent and in part pointed out hereinafter.

BRIEF DESCRIPTION OF THE SEVERAL VIEWS OF THE DRAWINGS

In the drawings.

Corresponding reference characters indicate corresponding parts throughout the drawings.

DETAILED DESCRIPTION OF THE INVENTION

Figure 1:
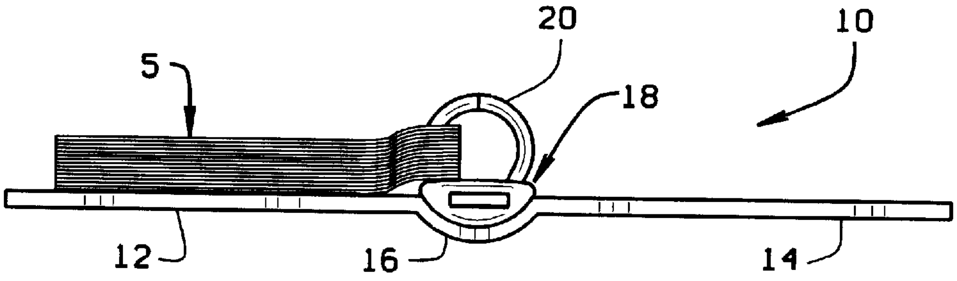
FIG. 1 is an end elevational view of a ring binder with a ring metal attached.

Referring to the drawings, a ring binder 10 for holding hole punched sheets S of paper has respective side leafs 12 and 14, and a center spine 16 intermediate the leafs. A ring metal 18 constructed as is well-known in the art is attached to the spine. Incorporated with the ring metal are a plurality of binder rings 20, and mechanism (not shown) for opening and closing the rings to insert and remove the sheets. The ring metal is attached to the spine of the binder during assembly of the binder. Rivets, for example, have heretofore been used for this purpose; although other constructions such as the tab construction shown in U.S. Pat. No. Des. 377,805 have also been used.

Figure 2:
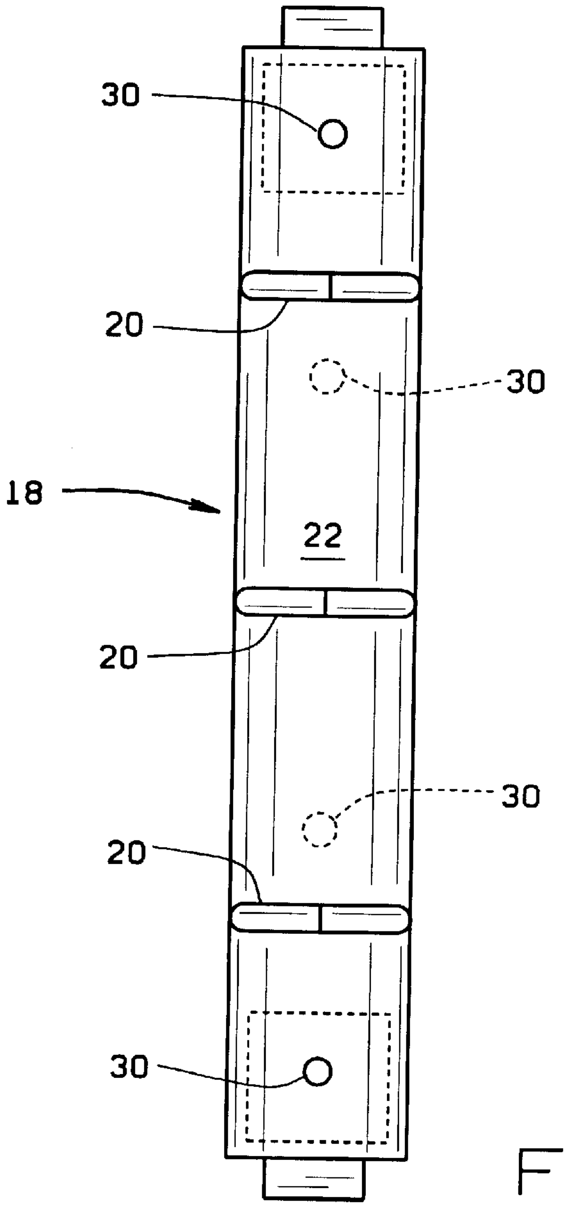
FIG. 2 is a top plan view of the ring metal illustrating the location of spur eyelets of the present invention used to secure the ring metal to the binder spine.
Figure 3:
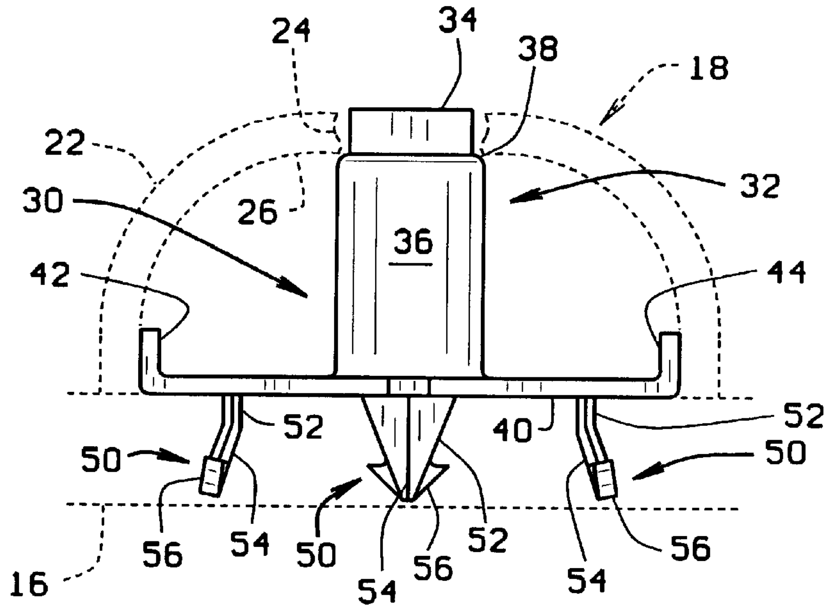
FIG. 3 is an elevational view of a spur eyelet.
Figure 4:
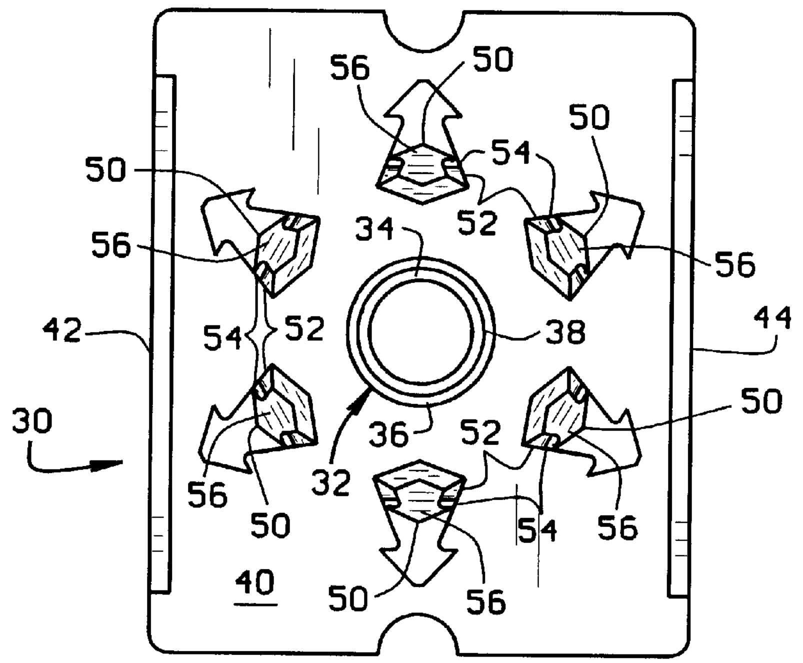
FIG. 4 is a bottom plan view of the eyelet.

In accordance with the present invention, a spur eyelet, indicated generally 30 in FIGS. 3 and 4, is usable to attach the ring metal to the spine. As indicated in FIG. 2, two eyelets 30 are used for this purpose, the eyelets being attached adjacent the respective ends of the ring metal. Additional eyelets 30 can also be used, if desired, these eyelets being located intermediate the ends of the ring metal. Each eyelet 30 first includes a post 32. One end 34 of the post attaches to the ring metal. As shown in FIG. 3, the metal has a shield 22 which covers the ring metal assembly. The shield has circular openings 24 formed therein sized to accommodate end 34 of the post. The post comprise a cylinder 36 of having a first outer diameter. At the outer end of this cylinder is a second and concentric cylinder 32 of a smaller outer diameter. The diameter of an opening 24 allows cylinder 32 to extend through the shield with the shoulder 38 formed at the junction of cylinders 34 and 36 abutting against the underside of the cover.

A plate 40 is formed on the other end, or base, of post 32. Plate 40 is a rectangular plate whose longitudinal axis is aligned with the longitudinal axis of cover 22 of the ring metal. As best shown in FIG. 3, the sides 42, 44 of plate 40 which extend parallel to the longitudinal axis form upturned lips. Cover 22 of the ring metal has a rounded profile and the lips 42, 44 abut against an inner surface 26 of the cover when the eyelet is attached to the cover, to align the eyelet and cover.

A plurality of spurs 50 are formed on plate 40. In FIG. 4, six spurs 50 are shown arranged in a concentric pattern about the base of post 32, the spurs being approximately 60° apart. The spurs, which are formed by a punching or stamping operation during manufacture of the eyelet, radiate radially outwardly from the underside of plate 40. Each spur further has a first spur section 52 extending perpendicular to plate 40 as shown in FIG. 3, and a second section 54 which extends outwardly at an angle from section 52. A barb 56 is formed on this second section of each spur, the barb being formed to prevent eyelet 30 from being pulled away from spine 16. Eyelet 30 is secured to spine 16 by pushing the spurs into the spine. Because the spurs have an angled outer section 54, this section deforms (i.e., flattens) as a result of the force applied to the eyelet. The barbed ends on the spurs now grip into the spine material whenever there is a force acting to pull the eyelet away from the spine. This prevents the ring metal from separating from the binder.

What has been described is a ring metal used in a binder, the ring metal having an improved structure for attaching the ring metal to the binder spine. At least two spur eyelets are employed. Each eyelet has a post secured to each end of a ring metal and spurs extending radially outwardly from the post with barbs formed on the end of each spur. This allows the ring metal to be readily secured to the spine with the barbs preventing subsequent pulling away of the ring metal from the spine. The spur eyelets are low cost, easy to manufacture, and readily installed during fabrication of a binder.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

I claim:

1. In a ring binder having a ring metal securable to a spine portion of the binder, a spur eyelet for attaching the ring metal to the spine, said eyelet including a plate, a post extending from said plate with one end of said post attaching to the ring metal, and a plurality of spurs formed on said plate on the opposite of said plate from said post, said spurs being pushed into said binder spine to grip said spine and secure said ring metal to said spine, an outer end of each spur having a barb formed thereon to prevent said eyelet from being pulled away from said spine thereby preventing the ring metal from separating from the binder.

2. The eyelet of claim 1 wherein said spurs radiate outwardly from an underside of said plate.

3. The eyelet of claim 2 wherein said spurs are concentrically formed spurs which radiate radially outwardly from said underside of said plate.

4. The eyelet of claim 3 wherein said plate is a rectangular plate whose longitudinal axis is aligned with the longitudinal axis of said ring metal.

5. The eyelet of claim 4 wherein the sides of plate extending parallel to said longitudinal axis form upturned lips.

6. The eyelet of claim 3 wherein each spur extends from said underside of said plate and has a first spur section extending perpendicular to said plate, and a second section which extends outwardly at an angle from said first section, said barb being formed on said second section.

7. The eyelet of claim 6 having six spurs each of which is approximately 60° apart.

8. The eyelet of claim 1 further including two eyelets, one eyelet being attached to each end of said ring metal.

9. The eyelet of claim 8 further including at least one additional eyelet attached to said ring metal intermediate the ends thereof.

10. In a ring binder having a ring metal securable to a spine portion of the binder, the improvement comprising a first spur eyelet and a second spur eyelet for attaching the ring metal to the spine, each spur eyelet including a plate from one side of which extends a post one end of which attaches to an end portion of said ring metal for a spur eyelet to be located at each end thereof, and a plurality of spurs formed on said plate and extending from an opposite side thereof, an outer end of each spur having a barb formed, said spurs being pushed into said spine to secure said ring metal to said spine and said barbs preventing said spur eyelets from being pulled away from said spine thereby preventing the ring metal from separating from the binder.

11. The improvement of claim 10 wherein said spurs radiate outwardly from an underside of each of said plates.

12. The improvement of claim 11 wherein said spurs are concentrically formed spurs.

13. The improvement of claim 12 wherein each spur has a first spur section extending perpendicular to said plate, and a second section which extends outwardly at an angle from said first section, said barb being formed on said second section.

14. The improvement of claim 10 further including at least one additional eyelet attached to said ring metal intermediate the ends thereof.

* * * * *